June 22, 1965  F. R. FOUNTAIN  3,190,383
LOAD INDICATOR
Filed Jan. 13, 1964

Forrest R. Fountain
INVENTOR.

BY

ATTORNEY 3,190,383
LOAD INDICATOR
Forrest R. Fountain, Houston, Tex.
(General Delivery, Rte. 2, Avoca, Tex.)
Filed Jan. 13, 1964, Ser. No. 337,194
4 Claims. (Cl. 177—137)

This invention relates to a load indicator for vehicles and particularly for railroad freight cars.

In inspecting railroad cars, particularly freight cars moving through freight yards in darkness as at night, it is frequently very difficult for the yardman or car inspector to determine a car is loaded or empty as it moves past his station, or as he may be walking past a string of cars.

The present invention has for its primary object the provision of an indicator device which may be mounted on a vehicle, particularly such as a freight car, which will provide a visual indication, clearly visible to the observer, which will immediately show the condition of the vehicle or car, that is, whether loaded or empty.

An important object is the provision of a form of visual indicator of the luminescent or light-reflective type which, when exposed to the rays of a suitable light source, such as a lamp or flashlight, will be rendered luminescent and which by its position relative to another element of the indicator, will provide a clear indication to the observer of the load condition of the vehicle.

Other and more specific objects and advantages of this invention will become readily apparent from the following detailed description when read in conjunction with the accompanying drawing which illustrates useful embodiments of the invention.

Figure 1:
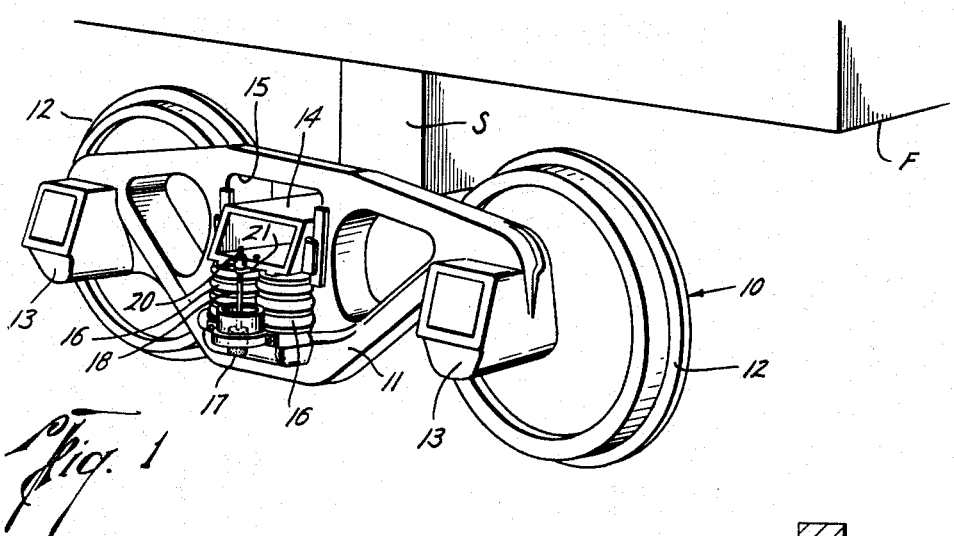
FIG. 1 is a perspective, elevational view of a railroad freight car truck having mounted thereon an indicator device in accordance with one embodiment of this invention.
Figure 2:
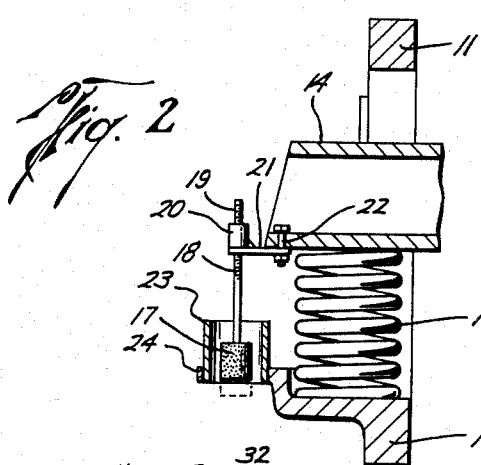
FIG. 2 is a vertical sectional view of a portion of the car truck showing the indicator elements in solid line positions indicating the unload condition of the car and in broken line positions indicating the loaded condition of the car.

Referring first to FIGS. 1 and 2, there is shown a conventional railroad freight car truck, designated generally by the numeral 10, which includes a truck frame 11 supported on wheels 12, the axles of which (not shown) are journalled in the journal boxes 13 at opposite ends of the truck frame. A conventional bolster 14 which supports the load of the freight car F on a spindle S, has its opposite ends (one shown) extending through an opening 15 in the center of the truck frame and resiliently supported therein on a pair of vertically disposed coil springs 16—16. With such conventional construction, it will be seen that as the load carried in freight car F is increased, the weight will be transmitted through bolster 14 to springs 16, compressing the latter and resulting in a corresponding downward movement of the bolster relative to truck frame 11. Usually the total amount of such movement between empty and full load conditions will be in the order of about one to two inches. There is thus provided a stationary element, truck frame 11, and a relatively movable element, bolster 14, which moves relative to the frame in response to the loading of car F.

In the embodiment illustrated in FIGS. 1 and 2, the indicator device comprises a generally cylindrical indicator body 17 secured to the lower end of a vertically disposed rod 18 which is threaded at its upper end at 19 to be received in a threaded sleeve 20 carried on a laterally extending bracket 21 which is secured to the outer end of bolster 14 by means of one or more bolts 22. A shield element 23, such as a tubular housing or sleeve, is secured to a portion of truck frame 11 below the bolster and springs 16 in any suitable manner as by means of the bolted strap 24. Sleeve 23 is positioned to receive and concentrically enclose body 17, which is free to move longitudinally within the sleeve in response to movement of bolster 14 relative to truck frame 11. By means of the threaded connection between rod 18 and sleeve 20, the position of body 17 may be varied, as desired, within the confines of sleeve 23. Generally, the positions of the indicator elements will be adjusted so that body 17, when freight car F is empty, will be completely withdrawn within the confines of sleeve 23, and when freight car F contains a load the resulting downward movement of bolster 14 will act through rod 18 to move body 17 downwardly sufficiently to cause its lower portion to project beneath the lower end of sleeve 23.

The exterior of body 17 will be treated in such a manner as to make its external surface light-responsive, so that during darkness, when light rays strike the exposed surface of body 17, the latter will become luminous so as to be visible to an observer in the vicinity of the car.

To thus render body 17 visible any number of conventional means may be employed, such as light-reflecting tapes, glass or plastic reflectors, luminescent or phosphorescent paints, and the like. For purposes of description, I term all of these light-responsive means "luminescent."

It will be seen, therefore, that sleeve 23 functions as a shield which will exclude light rays from impinging on the surface of body 17 when the freight car is in the unloaded condition, that is, when body 17 will be fully withdrawn within the confines of sleeve 23 and that projection of body 17 from the sleeve in response to load conditions will render the exposed portion of the body visible under light rays directed thereon.

With the described arrangement, it will be seen that as a string of cars fitted with the load indicator devices hereinabove described, moves past an inspector, he can, merely by flashing his lamp on the area of sleeve 23, be immediately apprised by the presence or absence of luminescence of a portion of body 17 of the condition of the freight car, that is whether loaded or empty.

It will be understood, of course, that while the luminescent element of the indicator is shown to be mounted on the movable portion of the car truck and the shield on the stationary portion, the positions may be reversed without changing the principles and functions herein involved. Moreover, it will be evident that the shapes of body 17 and sleeve 23 may be varied widely without changing the significant functions of the invention.

Figure 3:
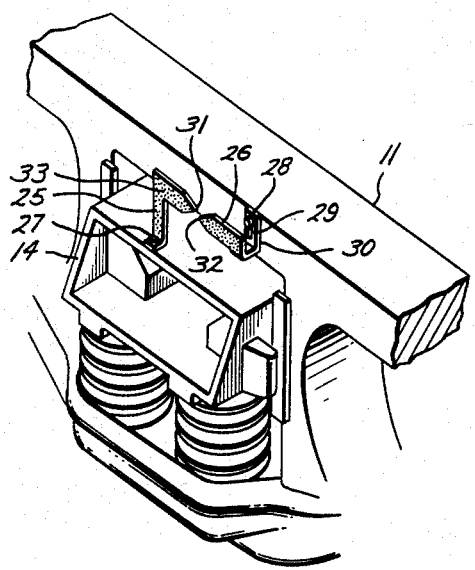
FIG. 3 is a fragmentary view in perspective of the freight car truck showing a modified form of the indicator device mounted thereon in positions indicating a non-loaded condition of the car.
Figure 4:
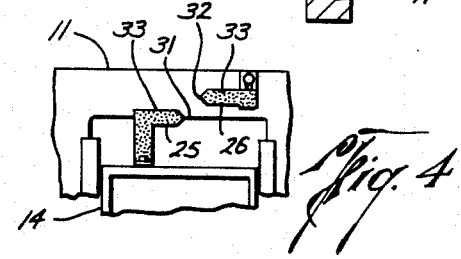
FIG. 4 is a fragmentary elevational view showing the parts of the indicator device in FIG. 3 in the positions indicating the loaded condition of the car.

FIGS. 3 and 4 illustrate a modified form of indicator device in accordance with this invention. Generally speaking, this embodiment comprises a pair of horizontally aligned indicator elements 25 and 26, one of which is secured to bolster 14 by means of a bolt 27 and the other to frame 11 by means of a bolt 28 which extends through a slot 29 formed in a bracket arm 30 which is integral with indicator element 26. Slot 29 permits vertical adjustment of indicator element 26 on frame 11. As illustrated, the indicator elements may be simple pieces of narrow flat metal provided with pointed end portions 31 and 32, respectively, disposed in opposed relation and slightly spaced apart. The indicator elements will be positioned so that when the car supported on the truck is in unloaded condition, the pointer ends 31 and 32 will be in perfect alignment, as seen in FIG. 3. When the freight car is loaded, bolster 14 will, of course, be depressed relative to frame 11 and indicator element 25 will be correspondingly displaced vertically relative to element 26, as seen in FIG. 4.

The exterior surfaces of indicator elements 25 and 26 will also be treated to render them luminescent, as by coating them with a surface coating 33 of a suitable light-reflecting, luminescent or phosphorescent material.

It will be understood that numerous other modifications and variations may be made in the details of the illustrative embodiments within the scope of the appended claims, but without departing from the spirit of this invention.

What I claim and desire to secure by Letters Patent is:

1. In a vehicle having a stationary portion and relatively movable portion under load, a load indicator device, comprising, spaced indicator elements mounted on the respective portions, one of said elements being displaceable relative to the other in response to loading of said vehicle, one of said indicator elements having luminescent properties to render the same visible in darkness when light is directed thereon, and the other of said elements comprising shield means positioned to prevent impingement of light rays on said one element when said vehicle is in unloaded condition.

2. A load indicator device according to claim 1 wherein said one indicator element is a generally cylindrical body, and said shield means is a light-opaque housing concentrically surrounding said cylindrical body and dimensioned to fully enclose said body in the unloaded condition of said vehicle, and permitting said body to project therefrom in response to loading of said vehicle.

3. In a railroad car truck including a wheel-mounted truck frame and a spring-supported bolster movable vertically relative to the frame under load, a load indicator device, comprising, spaced indicator elements mounted respectively on the frame and bolster, one of said elements being displaceable relative to the other in response to loading of said bolster, one of said indicator elements having luminescent properties to render the same visible in darkness when light is directed thereon, and the other of said elements comprising light-opaque shield means positioned to prevent impingement of light rays on said one element when said bolster is in unloaded condition.

4. In a vehicle having a stationary portion and a portion movable under load relative to said stationary portion, a load indicator device, comprising, an indicator element secured to one of said portions, a shield element secured to the other of said portions in a position to shield said indicator element from impingement of light rays thereon at one relative position of said portions, and to expose said indicator element to light rays at another relative position of said portions, said indicator element having luminescent properties to render the same visible in darkness when light is directed thereon.

References Cited by the Examiner
UNITED STATES PATENTS

| 1,294,298 | 2/19 | Moulton | 177—137 |
| 1,335,520 | 3/20 | Muller | 250—71 |
| 1,488,454 | 3/24 | White | 250—72 |
| 1,590,544 | 6/26 | Petersen | 177—137 |
| 1,640,930 | 8/27 | Gartner | 177—137 |
| 2,387,512 | 10/45 | Hilberg | 250—71 |
| 2,473,877 | 6/49 | Goldstein | 250—71 |

FOREIGN PATENTS 641,724    8/50    Great Britain.

References Cited by the Applicant
UNITED STATES PATENTS

| 825,839 | 7/06 | James. |
| 1,444,474 | 2/23 | McElroy. |
| 1,463,467 | 7/23 | Hayward. |
| 1,689,987 | 10/28 | Swartley. |
| 2,687,293 | 8/54 | Jackson. |

LEO SMILOW, *Primary Examiner.*